J. H. WALLACE.
AIR BRAKE APPARATUS.
APPLICATION FILED NOV. 28, 1910.
999,351.
Patented Aug. 1, 1911.
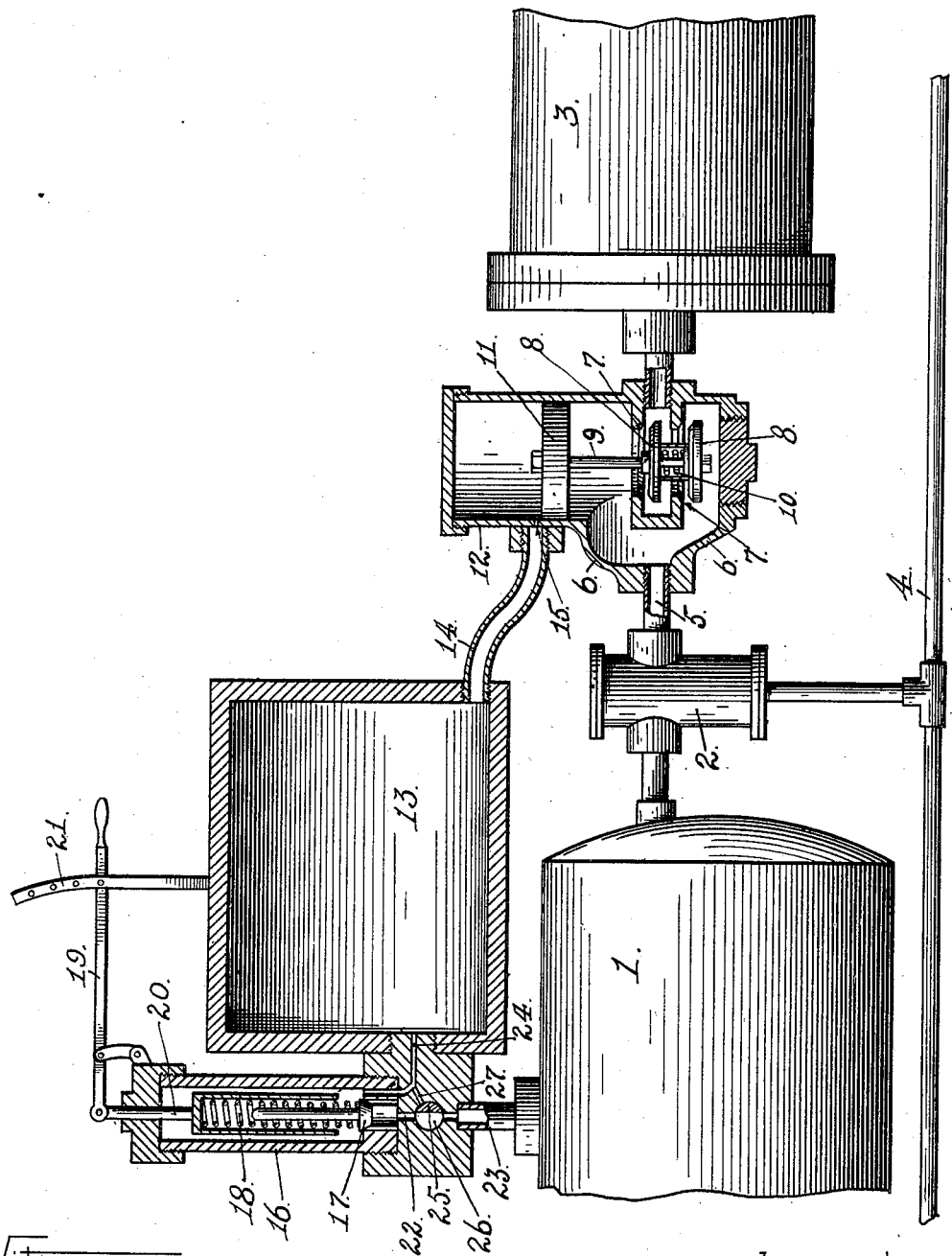

UNITED STATES PATENT OFFICE.

JOHN H. WALLACE, OF SAN FRANCISCO, CALIFORNIA.

AIR-BRAKE APPARATUS.

999,351.  Specification of Letters Patent.  Patented Aug. 1, 1911.

Application filed November 28, 1910.  Serial No. 594,507.

*To all whom it may concern:*

Be it known that I, JOHN H. WALLACE, a citizen of the United States, residing in the city and county of San Francisco and State of California, have invented certain new and useful Improvements in Air-Brake Apparatus, of which the following is a specification.

My invention relates to air-brake apparatus.

As now installed, the air-brake on railway equipment provides for a braking effect equal to about 90 per cent. of the weight of the empty car, and no satisfactory method, as far as I am aware, of increasing this when the car is loaded has yet been devised. A very simple method would be to regulate the air pressure admitted to the brake cylinder, by means of a regulating valve so constructed as to permit of adjustment to suit the load; the maximum pressure being admitted when the car was fully loaded and the minimum when the car was empty. But, while this would work satisfactorily in the case of a single car, or of several cars, uniformly loaded and adjusted, difficulties arise when such cars are in the same train with other cars not so equipped, or when, of a number of cars all similarly equipped, some are empty and others loaded. In this case, the amount of air drawn from the reservoirs of the different cars is different in amount, with the result that different pressures remain in the several reservoirs, and when the engineer places his valve in the release position, the release of those cars using the maximum pressure takes place first, and until the reservoir pressure in those cars reaches that of those using lighter pressure, the latter will not begin to release.

The object of my invention is to overcome this difficulty, and this I do by drawing from each reservoir the same quantity of air, whether the maximum or minimum pressure is admitted to the brake cylinder, thus maintaining a practically uniform pressure in all reservoirs. Then when the engineer releases the brakes, all triple-valves go to the release position at the same time, and the final release of all cars takes place, at practically, the same moment, or as nearly so as they do with the apparatus now used.

To accomplish this end, my invention consists in a second or regulating reservoir having the same cubical capacity as the brake cylinder when under maximum pressure, in which regulating reservoir is carried air under the pressure desired in the brake cylinder, said air being taken from the auxiliary reservoir through a properly adjusted regulatable pressure valve; and in a brake-pressure controlling device placed in the connection between the triple valve and the brake cylinder and having a connection also with the regulating reservoir, said controlling device being so constructed as to keep the connection from the triple valve to the brake cylinder open under the desired pressure in the regulating reservoir, and when this pressure is exceeded in the connection between the triple valve and the brake cylinder, to close said connection and open the connection to the regulating reservoir so that the excess of air will pass from the triple valve connection through said controlling device into the regulating reservoir.

When the brakes are applied the air at first passes from the auxiliary reservoir, through the triple-valve freely into the brake cylinder until the pressure in the brake cylinder slightly exceeds that initially admitted to the regulating cylinder, and as this point is reached and the air continues to pass through the triple valve, this excess of pressure closes the connection to the brake cylinder thus preventing any further increase of pressure in the latter, and at the same time opens the connection between the triple valve and the regulating reservoir. As the result of this no greater air pressure is given the brake cylinder, but the flow of air from the reservoir through the triple valve continues into the regulating reservoir, which being of the same size as the brake cylinder and under the same pressure, takes the same quantity of air as would the latter if its supply had not been cut off.

In a train of cars, some equipped with this apparatus set for the maximum brake pressure, others set for the minimum, or any intermediate pressure, and still others with the present apparatus, the reservoirs of all would be reduced to practically the same pressure by any application of the brakes, from a light service application to the emergency application, and upon the engineer placing his valve in the release position, all triple valves would work together and the release of air from all cars would begin at practically the same time. Those cars equipped with this apparatus and set for the minimum brake cylinder pressure would first discharge air from the regulating reservoir, and when this was reduced to the pressure in the brake cylinder, the controlling device would open and the air from said cylinder would be released.

Referring to the accompanying drawings—the figure is a view of the apparatus, partly in section.

1 is the auxiliary reservoir, 2 is the triple-valve, 3 is the brake-cylinder and 4 is the train-pipe, all in the usual form and disposition of air-brake apparatus.

Into the connection 5 from the triple-valve to the brake-cylinder is let a brake-pressure controlling device, as from its function, I choose to term it. This consists of a shell 6, having within it the double seat 7 for a balanced valve 8, which valve controls the connection to the brake-cylinder. The controlling valve 8 has fitted to it a stem 9, in such manner that said stem may have an independent sliding movement in the direction of its length, which movement is controlled by a spring 10. The upper end of the stem 9 is fitted with a piston 11, which is seated within a capped cylindrical portion 12 of the shell 6.

13 is a reservoir, which, from its function, I term a regulating reservoir. It may be suitably disposed as to position, and it has the same cubical capacity as the brake-cylinder when the latter is under maximum pressure, that is, when the piston in the brake-cylinder has made its full travel. This regulating reservoir has two connections with the auxiliary reservoir, one which I may term primary, and the other secondary, the latter being through the triple-valve and the casing 6 of the brake-pressure controlling device. This latter or secondary connection is shown by the pipe 14 which communicates with the cylindrical portion 12 of the casing 6, through a port 15.

The primary connection between the auxiliary and the regulating reservoirs is through what I will term a regulating valve. This comprises a shell 16, having seated within it a valve 17, which is adapted by any suitable means to be arbitrarily set for operation under any pressure desired. I have, for this purpose, shown a spring 18, so mounted that its pressure may be regulated and varied by a lever 19 and connecting rod 20, said lever playing upon and being fixed variably by an arc 21. The regulating valve 17 controls the port 22 which through the pipe connection 23 admits air from the auxiliary reservoir to the shell 16. A three-way cock 25, to be presently described, also controls this port in a manner which will hereinafter appear. The shell 16 communicates with the regulating reservoir through a passage 24.

The apparatus, as thus described, works as follows:—The regulating valve 17 is adjusted by means of the lever 19 to allow the entrance to the regulating reservoir 13 of air of the pressure desired in the brake cylinder, say, for example, 35 pounds per square inch for an empty car. This same pressure will then, of course, be upon the upper side of the piston 11 in the shell 6 of the brake pressure controlling device, and will cause the valve 8 of said device to remain open. When the brakes are applied, the air from the auxiliary reservoir will pass through the triple-valve and through the controlling valve 8 to the brake cylinder until the pressure in the latter reaches 35 pounds, when the pressure on both sides of the piston 11 will be the same. If the triple valve continues to admit air to the brake cylinder, the pressure on the lower side of the piston 11 will exceed that on its upper side, and said piston will move upward, closing the port 15, and also, by carrying the valve 8 up will cause said valve to close the communication between the triple valve and the brake cylinder, thus allowing no increase of pressure in the latter. But the piston 11, the stem 9 of which has an individual lineal movement, will continue its upward travel, and by passing the port 15 will open the secondary connection of the auxiliary reservoir with the regulating reservoir so that the excess of air over that required for the brake cylinder will pass through the triple valve and through the shell 6, port 15 and pipe 14 into the regulating reservoir, which being of the same capacity as the brake cylinder and under the same air pressure will take the same quantity of air as would the latter if the valve 8 had remained open. Thus for any application of the brakes, the same amount of air is drawn from the auxiliary reservoir whether the maximum or minimum pressure is admitted to the brake cylinder, and the air pressure in the auxiliary reservoir will be reduced the same in all cars of a train.

In practice, for the sake of better systematizing the operation, a three-way cock 25 is placed in the port 22. This cock has a passage 26 which when in one position leads direct from the connection 23 through the port 22 to the valve 17; and when turned to another position leads from said connection 23 to a passage 27 direct to the passage 24 into the regulating reservoir.

With the three-way cock, the operation would be as follows:—The regulating valve 17 would be set for the pressure desired for empty cars, and in the apparatus of such cars the three-way cock would be turned to admit the pressure through it only to the regulating valve. But for fully loaded cars requiring the full braking pressure, the three-way cock in the apparatus of such cars would be turned to pass the full pressure through it from the auxiliary reservoir direct to the regulating reservoir in which case the high pressure on the upper surface of piston 11 would keep the brake controlling valve 8 permanently open, thus admitting the maximum pressure of air to the brake cylinder. In this case also, the regulating reservoir being in direct communication with the auxiliary reservoir is in effect an addition to the storage capacity of the latter, giving a larger volume of air to be drawn from in setting the brakes and giving a little higher maximum pressure in the brake cylinder.

Having thus described my invention what I claim as new and desire to secure by Letters Patent is:—

1. In air-brake apparatus and in combination with the auxiliary reservoir, brake-cylinder and triple-valve; a regulating reservoir of the same capacity as the brake-cylinder, connected primarily with the auxiliary reservoir and provided with means for arbitrarily defining the primary pressure received therefrom, said regulating reservoir being also secondarily connected with said auxiliary reservoir through the triple-valve; and means controlled by a difference of pressure in said secondary connection for keeping open the communication between the triple valve and the brake-cylinder, until the pressure in the latter exceeds that primarily given to the regulating reservoir, and thereupon closing said communication and admitting the excess of pressure into the regulating reservoir through said secondary connection.

2. In air-brake apparatus and in combination with the auxiliary reservoir, brake-cylinder and triple-valve; a regulating reservoir of the same capacity as the brake-cylinder, connected primarily with the auxiliary reservoir and provided with means for arbitrarily defining the primary pressure received therefrom, said regulating reservoir being also secondarily connected with said auxiliary-reservoir through the triple-valve; a valve adapted to open and close the communication between the triple valve and the brake-cylinder; and means connected with said valve and exposed to a difference of pressure within the secondary connection of the regulating reservoir for keeping said valve open until the pressure in the brake cylinder exceeds that primarily given to the regulating reservoir, and thereupon closing said valve and admitting the excess of pressure into the regulating reservoir through said secondary connection.

3. In air-brake apparatus and in combination with the auxiliary-reservoir, brake-cylinder and triple-valve; a regulating reservoir of the same capacity as the brake-cylinder, connected primarily with the auxiliary-reservoir and provided with means for arbitrarily defining the primary pressure received therefrom, said regulating reservoir being also secondarily connected with said auxiliary-reservoir through the triple-valve; a valve adapted to open and close the communication between the triple-valve and the brake cylinder; and a piston connected with said valve and seated within the secondary connection of the regulating reservoir so as to be exposed on opposite sides to the pressure from the regulating reservoir and to the pressure from the triple valve respectively, and arranged to hold the valve open until the pressure from the triple valve to the brake cylinder exceeds that from the regulating reservoir and thereupon to close said valve and open the secondary connection to the regulating reservoir to admit the excess of pressure to said reservoir.

4. In air-brake apparatus and in combination with the auxiliary-reservoir, brake-cylinder and triple-valve; a regulating reservoir of the same capacity as the brake-cylinder and connected primarily with the auxiliary reservoir, and also connected secondarily with said auxiliary-reservoir through the triple valve; a pressure regulating valve in the primary connection, with means for setting it to arbitrarily define the primary pressure admitted to said regulating reservoir; and means controlled by a difference of pressure in said secondary connection for keeping open the communication between the triple valve and the brake-cylinder, until the pressure in the latter exceeds that primarily given to the regulating reservoir, and thereupon closing said communication and admitting the excess of pressure into the regulating reservoir through said secondary connection.

5. In air-brake apparatus and in combination with the auxiliary-reservoir, brake-cylinder and triple-valve; a regulating reservoir of the same capacity as the brake-cylinder and connected primarily with the auxiliary reservoir, and also connected secondarily with said auxiliary-reservoir through the triple valve; a pressure regulating valve in the primary connection, with means for setting it to arbitrarily define the primary pressure admitted to said regulating reservoir; and means controlled by a difference of pressure in said secondary connection for keeping open the communication between the triple valve and the brake-cylinder, until the pressure in the latter exceeds that primarily given to the regulating reservoir, and thereupon closing said communication and admitting the excess of pressure into the regulating reservoir through said secondary connection, comprising a valve controlling said communication to the brake cylinder, and a piston connected with the valve and so disposed in the secondary communication with the regulating reservoir as to be exposed on opposite sides to the primary pressure from the regulating reservoir to hold the valve open, and to the pressure from the triple valve to close the valve under the excess of pressure from the triple valve, and open the regulating reservoir to the excess of said pressure through the secondary connection.

6. In air-brake apparatus and in combination with the auxiliary-reservoir, brake-cylinder and triple-valve; a regulating reservoir of the same capacity as the brake-cylinder and connected primarily with the auxiliary reservoir and also connected secondarily with said auxiliary-reservoir through the triple-valve; a pressure regulating valve in the primary connection with means for setting it to arbitrarily define the primary pressure admitted to said regulating reservoir; a three-way cock controlling the communication through said regulating valve and also controlling a by-pass direct from said primary connection to the regulating reservoir; and means controlled by a difference of pressure in the secondary connection of the regulating reservoir for keeping open the communication between the triple valve and the brake-cylinder, until the pressure in the latter exceeds that primarily given to the regulating reservoir, and thereupon closing said communication and admitting the excess of pressure into the regulating reservoir through said secondary connection 7. In air-brake apparatus, and in combination with the auxiliary-reservoir, triple-valve and brake-cylinder thereof; means for withdrawing from the auxiliary-reservoir a volume of air sufficient for the maximum braking pressure; means, arbitrarily controlled, for passing to the brake cylinder all or such portion of said volume of air as may be desired for braking pressure; and means for diverting the excess of said volume of air, if any there be, from said brake cylinder.

In testimony whereof I have signed my name to this specification in the presence of two subscribing witnesses.

JOHN H. WALLACE.

Witnesses:
 Wm. F. Booth,
 D. B. Richards.

Copies of this patent may be obtained for five cents each, by addressing the "Commissioner of Patents, Washington, D. C."